United States Patent [19]

Ishii et al.

[11] Patent Number: 4,725,483

[45] Date of Patent: Feb. 16, 1988

[54] COPOLYESTER FILM AND A METHOD FOR PRODUCTION THEREOF

[75] Inventors: Masao Ishii, Kashima; Takayuki Okamura, Okayama; Keishiro Igi, Kurashiki; Osamu Kusudo, Kurashiki; Yoshito Hamamoto, Kurashiki, all of Japan

[73] Assignee: Kuraray Co., Ltd., Kurashiki, Japan

[21] Appl. No.: 865,969

[22] Filed: May 22, 1986

[30] Foreign Application Priority Data

May 31, 1985 [JP] Japan ................................ 60-119367

[51] Int. Cl.$^4$ ........................ B32B 7/00; B32B 27/06; B32B 27/36
[52] U.S. Cl. ..................................... 428/220; 428/480
[58] Field of Search ....................... 528/272, 300, 301; 428/220, 480

[56] References Cited

U.S. PATENT DOCUMENTS 4,335,188  6/1982  Igi et al. ........................... 528/301 X
4,452,853  6/1984  Schade et al. ...................... 528/301

*Primary Examiner*—Lucille M. Phynes
*Attorney, Agent, or Firm*—Oblon, Fisher, Spivak, McClelland & Maier

[57] ABSTRACT

A copolyester film is disclosed which comprises a copolyester in which the dicarboxylic acid component comprises 100 to 85 mole percent of terephthalic acid and the diol component comprises 65 to 97 mole percent of 1,4-butanediol and 3 to 35 mole percent of a polyethylene glycol with a molecular weight of 106 to 550. The copolyester has a reduced viscosity in the range of 0.8 to 1.4 dl/g as measured at a concentration of 0.5 g/dl in a 1:1 (by weight) solvent mixture of phenol and tetrachloroethane at 30° C. The copolyester has a main endothermic peak with a peak maximum temperature of 160° C. to 200° C. and at least one subsidiary endothermic peak with a peak maximum temperature of 30° C. to 80° C. in differential scanning calorimetry with the ratio (R) of the area occupying not less than 40° C. in the subsidiary endothermic peak, the main endothermic peak area being within the range of 3 percent to 20 percent.

A hot melt adhesive comprising the copolyester film and a method for producing the copolyester film are also disclosed. The hot melt adhesive has a high initial modulus of elasticity at high temperature (30°–50° C.) and features improved processability or workability while retaining the required properties of a hot melt adhesive.

7 Claims, 3 Drawing Figures

COPOLYESTER FILM AND A METHOD FOR PRODUCTION THEREOF

BACKGROUND OF THE INVENTION

1. Field of the Invention

The present invention relates to a copolyester film suitable for use as a hot melt adhesive and a method of producing the same.

2. Description of the Background

In recent years, hot melt adhesives have been used in increasing quantities due to their non-polluting, energy-saving and resource-conservation characteristics. Hot melt adhesives of the film type in particular, are known to be advantageous in that they produce an adhesive layer of uniform thickness and have a stable, uniform bond strength. Additionally, the desired adhesion can be established by mere melting of the superficial layer of the film. They lend themselves well to a short-time bonding process and require a minimum of bonding heat. Moreover, the thermal degradation of the adhesive is negligible.

Hot melt adhesives of the polyester type are well known. These adhesives are excellent in heat and cold resistance, thermal stability, electrical properties, weather resistance, moisture resistance, resistance to chemicals and safety in food use, and have therefore been widely used in such applications as electrical parts assembly, automotive parts assembly, textiles, can manufacture, etc.

Many proposals have heretofore been made regarding the components of polyester hot melt adhesives. For example, a hot melt adhesive of polyesters derived from a selected dicarboxylic acid component and a selected diol component having special structural formulas as the polyester materials is well known. Also known is a hot melt adhesive of polymers having a carboxylic acid amide, carboxylic acid anhydride, carbonic acid ester, urethane or urea bond either in the backbone chain or in the side chain (Japanese patent publication No. 22750/82). It is possible to improve a given property by using selected components or a selected combination of components, but such attempts tend to result in changes in other physical properties as well.

U.S. Pat. No. 4,143,790 discloses a polyester hot melt adhesive in which at least 45 mole % of the dicarboxylic acid component is accounted for by terephthalic acid and at least 55 mole % of the diol component is accounted for by 1,4-butanediol. Its relative viscosity and degree of crystallinity are in the ranges of 1.2 to 1.8 and 0 to 30 percent, respectively.

U.S. Pat. No. 3,515,628 teaches a polyester copolymer-based hot melt adhesive in which the dicarboxylic acid component is a mixture of terephthalic acid and an aliphatic dicarboxylic acid and its glycol component is either 1,4-butanediol or a mixtue of 1,4-butanediol and ethylene glycol, neopentyl glycol or the like. The adhesive has a glass transition temperature not higher than 30° C. and a degree of crystallinity not exceeding 25%.

U.S. Pat. No. 4,335,188 describes a copolyester hot melt adhesive in which at least 85 mole % of its dicarboxylic acid component is terephthalic acid and its diol component is a mixture of 97 to 65 mole % 1,4-butanediol and 3 to 35 mole % polyethylene glycol having a molecular weight in the range of 150 to 550.

Furthermore, U.S. Pat. No. 4,500,575 discloses a hot melt adhesive comprising a polyester copolymer consisting of a dicarboxylic acid component made from 70 to 97 mole % terephthalic acid and the balance of the other dicarboxylic acids, and a diol component made from 70 to 97 mol % 1,4-butanediol and 3 to 30 mol % diethylene glycol, with a reduced viscosity of a least 0.6 dl/g, a glass transition temperature of not less than 31° C., a degree of crystallinity in the range of 15 to 40% and a creep displacement of not greater than 0.16 mm.

The present inventors have previously filed a patent application (U.S. Pat. Nos. 730,055, 4,659,615 EP-85303366.0) for an invention directed to a technique for accomplishing well-coordinated tensile shear bond strength, T-peeling bond strength, durability and high-speed adhesion which had never been obtained from the hot melt adhesives of the prior art technologies which have been described briefly above However, the film obtainable from a copolyester according to the usual commercial film forming technology proposed thus far has a low initial modulus of elasticity at elevated temperatures (30° C. to 50° C.) and stretches under low tension. This leads to the disadvantage that with an increase in temperature in the production environment, the film is liable to stretch, causing a deterioration in workability in the film forming stage of production.

SUMMARY OF THE INVENTION

It is an object of the present invention to provide a film having improved handling characteristics, i.e., workability, without deteriorations in the various characteristics required for application as a hot melt adhesive.

It is another object of the present invention to provide a method for producing a film which has satisfactoy process stability from a copolyester having a specified composition range.

It is still another object of the present invention to provide a hot melt adhesive which is conducive to safety and to sanitation in food packaging applications.

Other objects and advantages of the present invention will become apparent as the following description of the present invention proceeds.

It has been found that when a polyester material having a specified composition range is selected and processed under a specified set of film forming conditions, the above-mentioned objects can be accomplished by increasing the area occupying not less than 40° C. in the subsidiary endothermic peak in differential scanning calorimetry. It has also been found that the subsidiary endothermic peak area should be subject to a certain upper limit and that a hot melt adhesive having a subsidiary endothermic peak area within a certain range is desirable.

Thus, the present invention provides a copolyester film comprising:

(a) a copolyester in which the dicarboxylic acid component comprises 100 to 85 mole % of terephthalic acid and the diol component comprises 65 to 97 mole % of 1,4-butanediol and 3 to 35 mole % of a polyethylene glycol with a molecular weight in the range of 106 to 550;

(b) the copolyester has a reduced viscosity in the range of 0.8 to 1.4 dl/g as measured at a concentration of 0.5 g/dl in a 1:1 by weight solvent mixture of phenol and tetrachloroethane at 30° C., (c) the copolyester has a main endothermic peak with a peak maximum temperature in the range of 160° C. to 200° C. and at least one subsidiary endothermic peak with a peak maximum temperature in the range of 30° C. to 80° C. in differntial scanning calorimetry, with the ratio (R) of the area occupying not less than 40° C. in the subsidiary endothermic peak to the main endothermic peak area being within the range of 3% to 20%.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is DSC curve according to the present invention.

FIG. 2 is a DSC curve according to the conventional technology.

FIG. 3 is a DSC curve for a comparative example with a large subsidiary endothermic peak area.

DETAILED DESCRIPTION OF THE PREFERRED EMBODIMENTS

Figure 1:
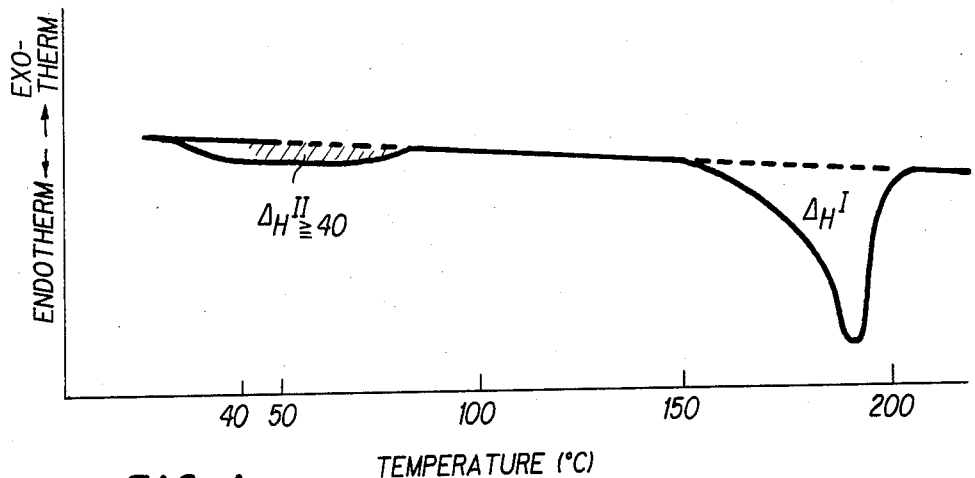
FIGS. 1 through 3 show differential scanning calorimetry (DSC) curves.

The conventional polyesters of the above-mentioned composition do not have a DSC subsidiary endothermic peak with a peak maximum temperature of 40° C. or higher, or if they do, the subsidiary peak is extremely small. Surpringly, the workabilty or ease of handling of the copolyester film can be improved without affecting the performance characteristics of the hot melt adhesive film by increasing the area under the subsidiary endothermic peak to within a specified range.

In the practice of the present invention, selection of the proper copolyester composition is essential to attainment of a hot melt adhesive which has strong adhesive power and excellent resistance to heat and water.

The dicarboxylic acid component of the linear polyester which is a main ingredient of an adhesive composition according to the present invention is terephthalic acid which may be partially replaced with one or more other copolymerizable dicarboxylic acids up to a limit of 15 mole %. Such compolymerizable dicarboxylic acids may, for example, be aromatic dicarboxylic acids such as isophthalic acid, 1,2-bis(p-carboxyphenoxy)ethane, 2,2-bis(p-carboxyphenyl)propane, etc. or aliphatic dicarboxylic acids such as succinic acid, adipic acid, etc. In the actual production of polyesters, the lower alkyl esters of these dicarboxylic acids can be used as well as the free acids.

These copolymerizable dicarboxylic acids are used only within a range that does not cause significant alterations in the melting point and crystallinity of the polyester and can be used when an improvement in peeling bond strength is desired even at the cost of a slight decrease in tensile shear bond strength. Excessive use of such copolymerizable dicarboxylic acids does not result in any further improvement in peeling strength but rather, causes a decrease in the solidification rate upon cooling of the molten polymer which interferes with short-time high-speed bonding, which is one of the merits of a hot melt adhesive. Moreover, there are cases in which the heat and water resistance of the hot melt adhesive are markedly decreased. From these considerations, the proportion of such copolymerizable dicarboxylic acids should not be more than 15 mole % and, preferably, not more than 10 mole % based on the total amount of the dicarboxylic acid component.

One of the diol components of the copolyester according to the present invention is 1,4-butanediol. In order to obtain a satisfactory bond strength, the use of 1,4-butanediol is essential. This appears to be due to the high crystallization rate of terephthalic acid type polyesters based on 1,4-butanediol. Thus, by the inclusion of 1,4-butanediol as an essential diol unit, high-speed adhesion is obtained. The proportion of 1,4-butanediol in the total diol component is 65 to 97 mole % and preferably in the range of 70 to 95 mole %.

The other essential unit of the diol component for the copolyester according to the present invention is a polyethylene glycol having a molecular weight in the range of 106 to 550. Though copolymerizable polyethylene glycols may have widely scattered molecular weights, a high degree of bond strength can only be obtained when polyethylene glycols in the above molecular weight range are selected and copolymerized in the proportions mentioned below. Thus, the possibility of attaining a high degree of bond strength is available only when the polyester composition made up of terephthalic acid and 1,4-butanediol is supplemented with a polyethylene glycol within the above-mentioned molecular weight range. Moreover, in regard to this bond strength, it is surprising that high values can be obtained in both tensile shear bond strength and peeling bond strength. If the molecular weight of polyethylene glycol is outside the above range, no adequate bond strength can be obtained. When the molecular weight is too high, it becomes difficult to obtain a polyethylene glycol of uniform molecular weight and in this case a mixture of polyethylene glycols each having a molecular weight within the above-mentioned range can be employed. Copolymerization with polypropylene glycol or polytetramethylene glycol is not recommended, for the resulting copolyester has poor adhesive strength. The proportion of polyethylene glycol is from 3 to 35 mole % of the total amount of the diol component. If the proportion of the polyethylene glycol is below 3 mole %, the adhesive strength, especially peeling bond strength, is low. If the proportion is over 35 mole %, the adhesive strength is low, and the rate of solidification of the molten polyester is too low for high-speed adhesion. The resistance of the film to heat and water is also adversely affected. A particularly desirable range for the polyethylene glycol is from 5 to 30 mole %.

When the copolyester according to the present invention is used in food packaging applications, the polyethylene glycol is preferably diethylene glycol.

While 1,4-butanediol and polyethylene glycol are used as the diol components above in the practice of the present invention, other diols may also be used. Thus, for example, alkane diols containing 2 to 10 carbon atoms, excepting 1,4-butanediol, can be employed. Specific examples of such "third" diols include ethylene glycol, propylene glycol, 1,6-hexanediol, and neopentyl glycol. The proportion of the "third" diol unit is generally not more than 20 mole % of the total diol component.

The degree of polymerization of the copolyester according to the present invention can be conveniently expressed in terms of reduced viscosity. The copolyesters employed have a reduced viscosity of 0.8 to 1.4 dl/g as measured in a 1:1 (wt/wt.) mixture of phenol and tetrachloroethane (concentration 0.5 g/dl) at 30° C. If the degree of polymerization is less than the above range, it leads to a decrease in bond strength so that it is difficult to fully exploit the inherent properties of the polymer. On the other hand, if the degree of polymerization exceeds the above range, the resulting decrease in melt fluidity leads to decreased bond strength. The preferred range of the reduced viscosity is 1.0 to 1.4 dl/g.

The polyester film according to the present invention can be obtained by melt-extruding a copolyester having the above-defined composition and reduced viscosity into a film and subjecting the film to heat treatment.

The research undertaken by the present inventors has shown that a copolyester film in the above composition range and reduced viscosity range may be made to have a main endothermic peak with a peak maximum temperature ($Y_I$) of 160° C. to 200° C. by selection of the proper composition. Moreover, when the proper copolyester composition and film-forming conditions are selected, the subsidiary endothermic peak of the film may have a peak maximum temperature ($Y_{II}$) in the range of 30° C. to 80° C. Furthermore, by selecting the proper heat-treatment conditions the ratio R, which can be calculated by means of equation (1), $$R(\%) = (\Delta H_{\geq 40}^{II} / \Delta H^I) \times 100 \qquad (I)$$

of the area occupying not less than 40° C. in the subsidiary endothermic peak ($\Delta H_{\geq 40}^{II}$) to the area of the main endothermic peak ($\Delta H^I$) can be brought into the range of 3 to 20%. The film satisfying the above requirements has very satisfactory handling or workability characteristics while retaining sufficient adhesive properties.

A film with an R value of less than 3% has a low initial modulus of elasticity at a temperature of 30° C. or higher and as the temperature in the production environment rises, tends to stretch and lose dimensional accuracy. Moreover, when allowed to stand, such a film is wrinkled. Thus, the processability of the film is poor. On the other hand, a film with an R value of more than 20% has a high initial modulus of elasticity at a temperature of 30° C. or higher but is so hard and brittle that the elongation at break is decreased at temperatures below 30° C.

The range of R is preferably 7 to 18% and, for still better results, 7 to 15%.

A preferred production method for the copolyester film according to the present invention is described below. In this method, a copolyester within the specified composition range is melt-extruded into a film which is solidified by cooling on a cooling drum under specified drum surface temperature, drum-film contact time, film haze and other conditions, and is finally heat-treated.

The method for producing a copolyester film in accordance with the present invention comprises melt-extruding a copolyester in which the dicarboxylic acid component comprises 100 to 85 mole % of terephthalic acid and the diol component comprises 65 to 97 mole % of 1,4-butanediol and 3 to 35 mole % of a polyethylene glycol having a molecular weight of 106 to 550 into a film, contacting the film with a cooling drum having a surface temperature of 50 to 80° C. for at least 8 seconds to give a film haze value of at least 6% on solidification, and heat-treating the film after removal from the cooling drum.

The term "haze" or "film haze" as used herein means a value determined in accordance with the procedure set forth in Japanese Industrial Standard (JIS) K-6714- 1977. This value is related generally to the crystalline state or internal microfine structure of a film.

In accordance with the present invention, a molten copolyester is first molded into a film which is then brought into contact with the surface of a cooling drum at 50° to 80° C., whereby it is cooled and solidified with formation and growth of spherical crystals. While the melting point of the copolyester depends on its composition, it is generally within the range of 160° to 230° C. Therefore, in a preferred embodiment, the molten polymer at 180° to 260° C. is extruded from a T-die into a film and this film is contacted with the surface of a cooling drum at 50° to 80° C. for at least 8 seconds until it is cooled and solidified so as to give a film haze of at least 6%.

On the cooling drum, the molten copolyester is solidified with white turbidity or opacity. This opacification occurs due to spherical crystals formed and growing in the film and the higher the degree of white opacification, the larger is the value of film haze. These spherical crystals can be observed by polarizing microscopy.

The film haze can be controlled by selecting the proper copolyester composition and proper cooling drum surface temperature, haul-off speed, film-drum contact time and other film-forming conditions. In the present invention, a remarkable stabilization of film formation is realized by selecting a film haze of at least 6 percent within a certain range of the cooling drum surface temperature.

For example, if the cooling drum surface temperature is below 50° C., the film cannot be easily detached from the cooling drum and if it is detached with force, the film becomes wrinkled or stretched. When the cooling drum surface temperature is 50° C. or higher and the other conditions are so selected as to give a film haze of at least 6%, the incidence of the above trouble decreases remarkably and the trouble is completely eliminated under the conditions conducive to a film haze of 8% or more. However, if the film haze bcomes too great and exceeds 30%, the peeling bond strength at the adhesive interface is adversely affected. The preferred range of film haze is 8 to 25%. However, if the cooling drum surface temperature exceeds 80° C., the film is softened and becomes sticky even if the film haze is 6% or higher, with the result that the film cannot be easily detached from the drum. Therefore, in the melt-extrusion of the copolyester, the cooling drum surface is maintained at a temperature between 50° and 80° C. and preferably between 55° and 75° C.

The duration of contact between the cooling drum surface and the extruded film is as important as the drum surface temperature. Thus, the ordinary film not more than 200 μm thick attains substantially the same temperature as that of the drum surface after about 2 seconds of contact but a further few seconds is generally required for spherical crystals to form and grow and for the extruded film to become solidified with white opacification. It is only after this time that the film can be easily detached from the cooling drum without formation of wrinkles, stretching, and other troubles. Thus, in order for the molten polyester to be solidified with progressive opacification, the contact time must be no less than 8 seconds and is preferably not less than 10 seconds. There is virtually no upper limit to contact time. However, since an unnecessarily long contact time is not only disadvantageous in production economics but also liable to cause hardening of the film, the contact time is generally not more than 5 minutes. In the present invention, the aforementioned heat treatment of the solidified film is an important step and the film subjected to the heat treatment is easier to handle and process than otherwise, while the excellent adhesive strenght of the film is fully maintained.

This heat treatment can be conducted by passing the film through a heating zone. The heating time and temperature can be selected in such a manner that the aforementioned R value is brought into the range defined above on the basis of differential scanning calorimetry results which are described below in detail.

The value of R can be increased by carrying out the heat treatment at a higher temperature or for a longer time. For the purposes of the present invention, the heat treating temperature is preferably 40° to 70° C. and, for still better results, 45° to 65° C. and the heat treating time is preferably 30 seconds to 8 minutes and, for still better results, 30 seconds to 5 minutes.

For use as a hot melt adhesive, the film preferably has a thickness within the range of 40-200 μm, although this range is not critical.

As necessary, the polyester film according to the invention may contain, for example, an antioxidant, in particular a phenolic antioxidant such as 2,6-di-tertbutyl-p-cresol or 2,2'-methylenebis-(4-methyl-6-tertbutyl-phenol); a material for providing the film with electrical conductivity, such as a metal or carbon powder; a metal oxide for rendering the film meltable by induction heating, such as iron oxide; a pigment as a colorant, such as titanium oxide, or mixtures of these, each in an appropriate amount so that the film can be used as a more worthwhile hot melt adhesive.

The adherends to which the film according to the invention can be applied may be made of any of those materials which can endure the adhesion temperature for the hot melt adhesive, e.g., metals, synthetic resins, fibrous materials, paper or ceramics. In particular, the film can produce marked effects in adhesion between metal plates, such as aluminum or stainless steel plates. In adhesion bonding of such metal adherends, the metal surface may preferably be treated in advance either chemically or with a primer such as an epoxy, phenolic or epoxy-phenolic resin. Such treatment is preferred since it can substantially double the bond strength.

The film according to the invention may be used, for example, in lamination of metal plates, lamination adhesion of joints of metal plate-made containers, manufacture of retortable pouches by metal foil-to-plastic film lamination, manufacture of water-resistant paper wares by metal foil-to-paperboard lamination, and manufacture of fire-resistant composites by metal plate-to-wood lamination. The constituents of the copolyester which are the essential elements of the present invention are all suitable for rendering the copolyester fit for manufacturing food-packaging containers. Furthermore, the copolyester is a material which, when tested for extractables with simulating solvents such as an alcohol, gives very low leachate impurity levels. Accordingly, it is easy to open up new avenues of use for the above-mentioned film as a hot melt adhesive in the field of food-packaging containers.

The film-shaped hot melt adhesive according to the invention is used in the conventional manner. Thus, it is inserted, in an appropriate shape and size, between the adherends such as those mentioned above and heated with pressing, whereby it works as a hot melt adhesive. In this process, preliminary heating may be made by a conventional method, if such heating is necessary. It is recommended that pressing under heating be followed by quenching.

Other features of the invention will become apparent in the course of the following descriptions of exemplary embodiments which are given for illustration of the invention and are not intended to be limiting thereof.

The following examples illustrate the invention in more detail. In the examples, the measurements were made by the methods given below.

Analysis by differential scanning calorimetry (DSC)

A Perkin-Elmer model DSC2C system was used. An aluminum pan was packed with about 10 mg of the sample and the temperature was raised from 0° C. at a rate of 10° C./min. Indium and tin were used for correction of the endothermic peak maximum and the heat of fusion.

Tensile characteristics

The tensile characteristics were measured within the temperature range of 20°-50° C. by the methods described in JIS K 7113-1981.

Tensile shear bond strength

Stainless steel (SUS-304) pieces were used as the adherends. The film was sandwiched between the specified metal members and the assembly was set between two larger-sized retaining metal sheets. The assembly was pressed under heating by means of a hot press held at a temperature higher by 40° C. than the melting point of the polyester. Thirty seconds after melting of the polyester, the above assembly was taken out and immersed in water at 20° C. to complete the bonding. The thickness of the adhesive layer in the assembly test piece was controlled at 60 μm by using spacers. The test piece was taken out of the water, wiped free of moisture, allowed to dry in the air and subjected to bond strength determination. The measurement of bond strength was carried out at 20°±5° C. and 65±20 % R.H. (relative humidity). The measurements were made according to JIS K 6850-1972.

EXAMPLE 1

A copolyester was prepared in the form of chips. The composition of said copolyester as determined by $^1$H-NMR was as follows: acid component - terephthalic acid; diol component - 75 mole % 1,4-butanediol, 18 mole % 1,6-hexanediol and 7 mole % polyethylene glycol having a molecular weight of 300. The copolyester showed, in DSC, a main endothermic peak maximum at 185° C. and had a reduced viscosity of 1.20 dl/g as determined at 30° C. in a 1:1 (weight ratio) mixed solvent composed of phenol and tetrachloroethane. The polyester chips were melt-extruded through a T-die at 230° C. and the extrudate was soldified by cooling on a cooling drum maintained at a surface temperature of 65°±2° C. for 10 seconds while the rate of draw was controlled so that a thickness of 65 μm was obtained. The resulting film was passed through a heating zone for heat treatment at 60° C. for 2 minutes and then wound up on a roll. This film showed a reduced viscosity of 1.17 dl/g as determined in the above manner.

For the above film, the results of DSC, tensile characteristics within the temperature range of 20°-50° C. and tensile shear bond strength (SUS-304 stainless steel adherends) are shown in Table 1.

The above procedure was followed except that the cooling drum surface temperature was lowered to 45°

C. The film thus obtained showed a haze as low as 2% and was easy to stretch. The film on the cooling drum was not ready to peel off. The film sometimes wound around the cooling drum necessitating stopping the film-forming machine for corrective measures.

COMPARATIVE EXAMPLE 1

A copolyester film was produced in the same manner as Example 1 except that the heat treatment after the cooling drum was omitted. The reduced viscosity, DSC data, tensile characteristics at different given temperatures and tensile shear bond strength are shown in Table 1. The initial elasticity modulus values obtained at 30°-50° C. were smaller compared with those found in Example 1, indicating that the film was ready to stretch.

COMPARATRIVE EXAMPLE 2

A polyester film was produced in the same manner as Example 1 except that the heating treatment after the cooling drum was conducted at 60° C. for 15 minutes. The properties of this film are shown in Table 1. The elongation-at-break values were small compared with those obtained in Example 1, indicating easy breakability of the film.

Figure 2:
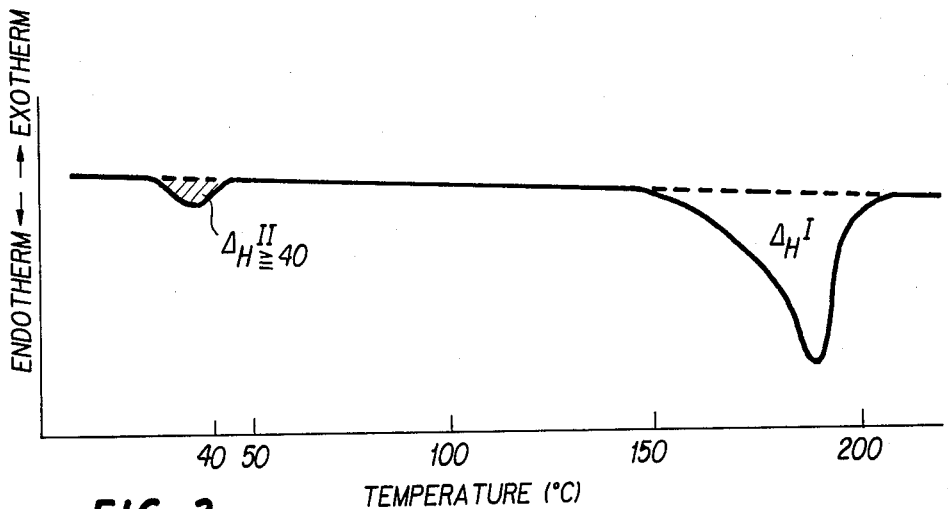
Figure 3:
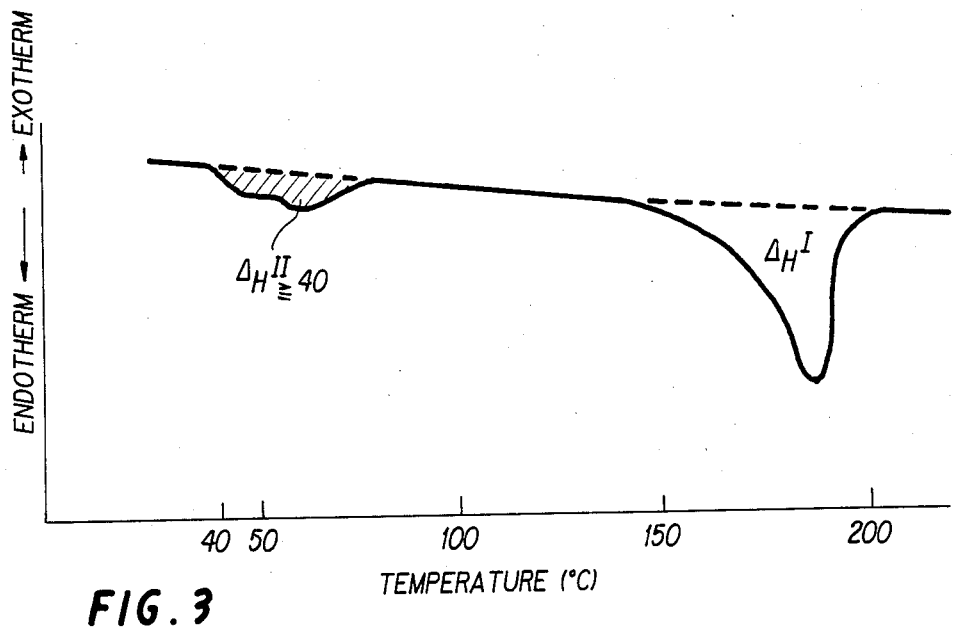

The differential scanning calorimetry curves for the films of Example 1, Comparative Example 1 and Comparative Example 2 are shown in FIG. 1, FIG. 2, and FIG. 3, respectively. In these figures, the area indicated by slanting lines is the $\Delta H \geq 40^{II}$ peak area. The tendencies were the same respectively in other examples and comparative examples.

EXAMPLE 2

A copolyester was prepared in the form of chips. The composition of the copolyester as determined by $^1$H-NMR was as follows: acid component - 92 mole % terephthalic acid and 8 mole % sebacic acid; diol component - 78 mole % 1,4-butanediol and 22 mole % triethylene glycol. The copolyester showed, in DSC, a main endothermic peak maximum at 187° C. and had a reduced viscosity of 1.18 dl/g as determined at 30° C. in a 1:1 (weight ratio) mixed solvent composed of phenol and tetrachloroethane. The polyester chips were melt-extruded through a T-die at 230° C. and the extrudate was solidified by cooling on a cooling drum maintained at a surface temperature of 50°±2° C. for 12 seconds while the rate of draw was controlled so that a thickness of 65 μm was obtained. The resulting film was passed through a heating zone for heat treatment at 60° C. for 2 minutes and then wound up on a roll. This film showed a reduced viscosity of 1.15 dl/g. The properties of the film are shown in Table 1.

COMPARATIVE EXAMPLE 3

A copolyester film was produced in the same manner as Example 2 except that the heat treatment after the cooling drum was not conducted. The properties of the film are shown in Table 1.

COMPARATIVE EXAMPLE 4

A copolyester film was produced in the same manner as Example 2 except that the heat treatment after the cooling drum was conducted at 60° C. for 10 minutes. The properties of the film are shown in Table 1.

EXAMPLE 3

A copolyester was prepared in the form of chips. The composition of the copolyester as determined by $^1$H-NMR was as follows: acid component - 92 mole % terephthalic acid and 8 mole % sebacic acid; diol component - 75 mole % 1,4-butanediol and 25 mole % diethylene glycol. The copolyester showed, in DSC, a main endothermic peak maximum at 180° C. and had a reduced viscosity of 1.25 dl/g as determined at 30° C. in a 1:1 (weight ratio) mixed solvent composed of phenol and tetrachloroethane. The copolyester chips were melt-extruded through a T-die at 230° C. and the extrudate was soldified by cooling on a cooling drum maintained at a surface temperature of 58°±2° C. for 8 seconds while the rate of draw was controlled so that a thickness of 80 μm was obtained. The resulting film was passed through a heating zone for heat treatment at 60° C. for 1 minute and then wound up on a roll. This film showed a reduced viscosity of 1.23 dl/g as determined in the above manner. The properties of the film are shown in Table 1.

COMPARATIVE EXAMPLE 5

A copolyester film was produced in the same manner as Example 3 except that the heat treatment after the cooling drum was not conducted. The properties of the film are shown in Table 1.

COMPARATIVE EXAMPLE 6

A copolyester film was produced in the same manner as Example 3 except that the heat treatment after the cooling drum was conducted at 50° C. for 15 minutes. The properties of the film are shown in Table 1.

EXAMPLE 4

A copolyester was prepared in the form of chips. The composition of said copolyester as determined by $^1$H-NMR was as follows: acid component - 92 mole % terephthalic acid and 8 mole % isophthalic acid; diol component - 78 mole % 1,4-butanediol and 22 mole % diethylene glycol. Said copolyester showed, in DSC, a main endothermic peak maximum at 185° C. and had a reduced viscosity of 1.15 dl/g as determined at 30° C. in a 1:1 (weight ratio) mixed solvent composed of phenol and tetrachloroethane. The polyester chips were melt-extruded through a T-die at 230° C. and the extrudate was soldified by cooling on a cooling drum maintained at a surface temperature of 65°±2° C. for 12 seconds while the rate of draw was controlled so that a thickness of 65 μm was obtained. The resulting film was passed through a heating zone for heat treatment at 60° C. for 1 minute and then wound up on a roll. This film showed a reduced viscosity of 1.13 dl/g as determined in the above manner. The properties of the film are shown in Table 1.

COMPARATIVE EXAMPLE 7

A copolyester film was produced in the same manner as Example 1 except that the reduced viscosity of the copolyester chip to be used was 0.75 dl/g. The properties of the film are shown in Table 1. These results indicate that the film obtained in this example is unfavorably low in elongation at break and in tensile shear bond strength.

COMPARATIVE EXAMPLE 8

A copolyester film was produced in the same manner as Example 4 except that the heat treatment after the cooling drum was not conducted. The properties of the film are shown in Table 1.

COMPARATIVE EXAMPLE 9

A copolyester film was produced in the same manner as Example 4 except that the heat treatment after the cooling drum was conducted at 60° C. for 10 minutes. The properties of the film are shown in Table 1.

In the above working examples and comparative examples, the film could be peeled off smoothly from the cooling drum only when the cooling drum surface temperature and the time assigned for contact between the drum and the film were within the respective ranges specified by the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hot melt adhesive in hte form of a film, comprising a copolymer comprised of (i) a dicarboxylic acid component and (ii) a diol component,
    wherein said dicarboxylic acid component comprises 100 to 85 mole percent terephthalic acid and the diol component comprises 65 to 97 mole percent 1,4-butanediol and 3 to 35 mole percent of a polyethylene glycol with a molecular weight in the range of 106 to 550; and wherein
    said copolyester has a reduced viscosity in the range of 0.8 to 1.4 dl/g as measured at a concentration of 0.5 g/dl in a 1:1 by weight solvent mixture of phenol and tetrachloroethane at 30° C., and wherein
    said copolyester has a main endothermic peak with a peak maximum temperature of 160° C. to 200° C. and at least one subsidiary endothermic peak with a peak maximum temperature of 30° C. to 80° C. in

TABLE 1

Physical Characteristics of Various Films

| Example | Reduced viscosity of film (dl/g) | $Y_1$ (°C.) | $\Delta H^I$ (cal/g) | $Y_I$ (°C.) | $\Delta H_{\geq 40}^{II}$ (cal/g) | R (%) | YMi (Kg/cm$^2$) 20°C | σb (Kg/cm$^2$) 20°C | εb (%) 20°C | YMi (Kg/cm$^2$) 30°C | σb (Kg/cm$^2$) 30°C | εb (%) 30°C |
|---|---|---|---|---|---|---|---|---|---|---|---|---|
| Example 1 | 1.17 | 185 | 8.6 | 72 | 1.1 | 12.8 | $21.0 \times 10^3$ | 445 | 520 | $16.5 \times 10^3$ | 420 | 510 |
| Comparative Example 1 | 1.18 | 185 | 8.4 | 33 | 0.2 | 2.4 | $19.0 \times 10^3$ | 440 | 525 | $10.0 \times 10^3$ | 420 | 520 |
| Comparative Example 2 | 1.17 | 185 | 8.4 | 74 | 2.0 | 23.8 | $24.0 \times 10^3$ | 200 | 150 | $18.0 \times 10^3$ | 250 | 200 |
| Example 2 | 1.15 | 187 | 8.2 | 73 | 1.2 | 14.6 | $14.5 \times 10^3$ | 420 | 500 | $10.0 \times 10^3$ | 400 | 480 |
| Comparative Example 3 | 1.14 | 187 | 8.4 | 31 | 0.2 | 2.4 | $13.0 \times 10^3$ | 440 | 480 | $4.5 \times 10^3$ | 420 | 450 |
| Comparative Example 4 | 1.14 | 187 | 8.4 | 75 | 2.1 | 25.0 | $15.0 \times 10^3$ | 250 | 250 | $12.5 \times 10^3$ | 240 | 280 |
| Example 3 | 1.23 | 180 | 8.0 | 45 | 0.6 | 7.5 | $12.5 \times 10^3$ | 440 | 520 | $7.0 \times 10^3$ | 410 | 490 |
| Comparative Example 5 | 1.22 | 180 | 7.8 | 33 | 0.2 | 2.6 | $12.0 \times 10^3$ | 460 | 510 | $4.0 \times 10^3$ | 400 | 500 |
| Comparative Example 6 | 1.22 | 180 | 7.8 | 66 | 1.7 | 21.8 | $13.5 \times 10^3$ | 220 | 240 | $8.5 \times 10^3$ | 260 | 280 |
| Example 4 | 1.13 | 185 | 8.2 | 70 | 0.6 | 7.3 | $14.5 \times 10^3$ | 380 | 450 | $9.0 \times 10^3$ | 360 | 440 |
| Comparative Example 7 | 0.72 | 185 | 8.0 | 69 | 0.5 | 6.3 | $14.0 \times 10^3$ | 210 | 100 | $8.5 \times 10^3$ | 200 | 80 |
| Comparative Example 8 | 1.12 | 185 | 7.8 | 32 | 0.2 | 2.6 | $14.0 \times 10^3$ | 390 | 440 | $6.5 \times 10^3$ | 340 | 460 |
| Comparative Example 9 | 1.13 | 185 | 8.0 | 73 | 1.8 | 22.5 | $15.0 \times 10^3$ | 210 | 200 | $12.0 \times 10^3$ | 200 | 240 |

| Example | YMi (Kg/cm$^2$) 40°C | σb (Kg/cm$^2$) 40°C | εb (%) 40°C | YMi (Kg/cm$^2$) 50°C | σb (Kg/cm$^2$) 50°C | εb (%) 50°C | Tensile shear bond strength (Kg/cm$^2$) |
|---|---|---|---|---|---|---|---|
| Example 1 | $10.5 \times 10^3$ | 380 | 450 | $6.0 \times 10^3$ | 350 | 440 | 145 |
| Comparative Example 1 | $3.5 \times 10^3$ | 360 | 445 | $1.7 \times 10^3$ | 310 | 450 | 148 |
| Comparative Example 2 | $13.0 \times 10^3$ | 390 | 450 | $7.0 \times 10^3$ | 340 | 420 | 146 |
| Example 2 | $6.5 \times 10^3$ | 350 | 450 | $2.0 \times 10^3$ | 330 | 430 | 140 |
| Comparative Example 3 | $2.5 \times 10^3$ | 320 | 450 | $0.8 \times 10^3$ | 320 | 440 | 143 |
| Comparative Example 4 | $7.5 \times 10^3$ | 330 | 420 | $2.5 \times 10^3$ | 340 | 430 | 140 |
| Example 3 | $4.0 \times 10^3$ | 350 | 450 | $1.5 \times 10^3$ | 340 | 410 | 145 |
| Comparative Example 5 | $1.5 \times 10^3$ | 350 | 460 | $0.6 \times 10^3$ | 320 | 430 | 145 |
| Comparative Example 6 | $5.0 \times 10^3$ | 360 | 440 | $2.5 \times 10^3$ | 340 | 420 | 143 |
| Example 4 | $5.0 \times 10^3$ | 320 | 430 | $2.0 \times 10^3$ | 300 | 420 | 146 |
| Comparative Example 7 | $5.5 \times 10^3$ | 180 | 80 | $2.0 \times 10^3$ | 150 | 60 | 95 |
| Comparative Example 8 | $2.5 \times 10^3$ | 330 | 450 | $1.0 \times 10^3$ | 310 | 420 | 146 |
| Comparative Example 9 | $6.5 \times 10^3$ | 320 | 440 | $2.5 \times 10^3$ | 310 | 430 | 143 |

*YMi - initial modulus of elasticity; σb - tensile strength at break; εb - elongation at break.

differential scanning calorimetry, with the ratio of the area occupying not less than 40° C. in the subsidiary endothermic peak to the main endothermic peak area being within the range of 3 percent to 20 percent, and wherein
said film has a thickness in the range of 40 μm to 200 μm.

2. The hot melt adhesive in the form of a film of claim 1, wherein said dicarboxylic acid component further comprises not more than 15 mole percent of isophthalic acid.

3. The hot melt adhesive in the form of a film of claim 1, wherein said dicarboxylic acid component further comprises not more than 15 mole percent of sebacic acid.

4. The hot melt adhesive in the form of a film of claim 1, wherein said polyethylene glycol is diethylene glycol.

5. The hot melt adhesive in the form of a film of claim 2, wherein said dicarboxylic acid component comprising not more than 15 mole percent of said isophthalic acid and said polyethylene glycol is diethylene glycol.

6. The hot melt adhesive in the form of a film of claim 3, wherein said dicarboxylic acid component comprises not more than 15 mole percent of said sebacic acid and said polyethylene glycol is diethylene glycol.

7. The hot melt adhesive in the form of a film of claim 1, wherein the said ratio lies in the range of 7 to 15 percent.

* * * * *